United States Patent [19]

Amir

[11] Patent Number: 5,075,559
[45] Date of Patent: Dec. 24, 1991

[54] METHOD FOR MEASURING THE THICKNESS OF A LIGHT-REFLECTIVE LAYER ON A LIGHT-TRANSLUCENT SUBSTRATE

[75] Inventor: Israel Amir, Ewing, N.J.

[73] Assignee: AT&T Bell Laboratories, Murray Hill, N.J.

[21] Appl. No.: 573,092

[22] Filed: Aug. 27, 1990

[51] Int. Cl.$^5$ .............................................. G01V 9/04
[52] U.S. Cl. .................................... 250/560; 356/381
[58] Field of Search ...................... 250/560, 561, 206.1; 356/381, 376, 375

[56] References Cited

U.S. PATENT DOCUMENTS 4,461,575 7/1984 Miller, Jr. et al. .................. 250/560
4,583,857 4/1986 Grammerstorff et al. ......... 356/375
4,810,894 3/1989 Nagao et al. ........................ 250/560
4,902,902 2/1990 Tole .................................... 250/560

Primary Examiner—David C. Nelms
Assistant Examiner—Que T. Le
Attorney, Agent, or Firm—Robert B. Levy

[57] ABSTRACT

Measurement of the thickness of a light-reflective layer (20) on a light-translucent substrate (10) is carried out in a non-destructive fashion by placing a light-reflective member of a known height, taller than the layer, adjacent thereto. The height difference between the layer and the member is measured optically, using the triangulation technique. By subtracting the measured height difference from the known height of the member, the height of the light-reflective member is easily obtained.

6 Claims, 1 Drawing Sheet

METHOD FOR MEASURING THE THICKNESS OF A LIGHT-REFLECTIVE LAYER ON A LIGHT-TRANSLUCENT SUBSTRATE

TECHNICAL FIELD

This invention relates to a technique for non-destructively measuring the thickness of a light-reflective layer on a light-translucent substrate, and more particularly, for measuring the thickness of a layer of metallization on a circuit board.

BACKGROUND OF THE INVENTION

The backbone of virtually all electronic systems is the printed circuit board which serves as the primary mechanism for mounting as well as interconnecting electronic components. Conventional single-layer printed circuit boards are typically manufactured by first laminating a thin sheet of copper to a resin substrate such as FR-4 or the like. The copper is then photolithographically patterned to yield the desired arrangement of copper circuits (traces) on the substrate surface. Through-holes may be drilled to create apertures for receiving component leads. Once the holes have been drilled, the substrate may then be electroless copper plated to metallize the through-holes to yield a single layer circuit board. Multi-layer circuits are produced by laminating very thin individual single-layer boards together. The copper traces on each layer of a multi-layer board are selectively connected to those on one or more adjacent layers by way of metal-plated through-holes (vias).

Careful control of the thickness of the copper traces on the circuit board is extremely important. If the copper traces are too thin, then the impedance of the trace may become too large, adversely affecting the circuit board operation. In addition, traces which are too thin may prematurely crack or break. If the copper traces are too thick, then difficulty may be incurred in laminating successive layers of the multi-layer board together. In addition, very thick copper traces are wasteful, increasing the cost of circuit board production. For these reasons, it is useful to monitor the copper trace thickness.

In the past, conventional optical thickness measurement techniques such as triangulation, have not proven themselves successful for accurately measuring the copper trace thickness on the circuit board. The reason is that such techniques usually require the board area adjacent to the trace to reflect light into a light-sensing mechanism, such as a photodiode or the like. Typically, FR-4 material is light translucent, making it extremely difficult to obtain light reflection from the top surface of the board.

Because of the inability to use conventional optical thickness measuring techniques, the thickness of the copper traces on a circuit board is presently established by physically removing the copper traces, typically by peeling them from the board, and the measuring their thickness using conventional methods. While this technique is very effective, yielding very accurate results, the board is destroyed during the process. Consequently, it is only possible to measure the copper trace thickness on a sampled basis.

Thus, there is a need for a technique for non-destructively measuring the thickness of a light-reflective layer (e.g., copper trace) on a light-translucent substrate (e.g., a circuit board).

SUMMARY OF THE INVENTION

Briefly, in accordance with a preferred embodiment of the invention, a technique is provided for non-destructively measuring the thickness of a light-reflective layer on a light-translucent substrate. The technique is initiated by placing a light-reflective member, e.g., a metal disc, of a precisely known thickness, on the substrate immediately adjacent to the thickness of the light-reflective layer to be measured. The thickness (height) differential between the member and the light-reflective layer is then optically measured, typically by use of the well-known triangulation method. To measure the thickness differential by triangulation, a beam of light, typically from a laser, is directed at an angle $\theta$ towards the substrate so as to illuminate a portion of the light-reflective coating lying directly below a light-intensity sensor, such as a photodetector or the like. Thereafter, the substrate (or alternatively, the laser beam) is displaced a distance d so that the beam now strikes the light-reflective member. The height differential ($h_1 - h_2$) between the light-reflective layer and the light-reflective member of known height can be obtained from the relationship $(h_1 - h_2) = d \cdot \tan(\theta)$. Once the height differential is established by triangulation in this manner, the height of the light-reflective layer can be obtained by subtracting the measured height differential from the known height of the light-reflective member placed on the substrate.

The foregoing technique allows the height (thickness) of the light-reflective layer to be measured very accurately, using a non-destructive optical technique.

DETAILED DESCRIPTION

Figure 1:
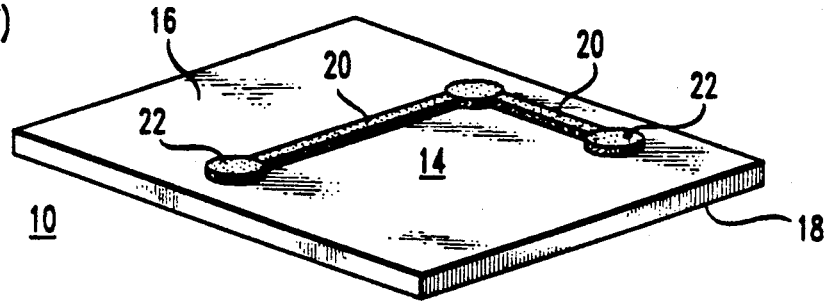
FIG. 1 is a perspective view of a prior art circuit board having at least one metallized trace on one of its major surfaces.

FIG. 1 is a perspective view of a conventional printed circuit board 10 which is comprised of a sheet of material, such as FR-4 or the like, which has a pattern of metallization 14 on at least one of its major surfaces 16 and 18. The pattern of metallization 14 typically consists of one or more strips or traces 20 of metallization which link a pair of metallized areas 22 which may or may not have through-plated apertures therein. In practice, the pattern of traces 20 and pads 22 is established by photolithographically patterning a layer of metallization (not shown), typically copper, laminated to one or both of the circuit board surfaces 16, 28.

It is important during the manufacture of the circuit board 10 to carefully control the thickness of the metallized traces 20 and the pads 22. If the traces 20 and pads 22 are too thin, then the impedance between a pair of interconnected pads may exceed the desired impedance value for the circuit board 10. Also, if the traces 20 and pads 22 are too thin, they may crack or break. On the other hand, if the traces 20 and pads 22 are too thick, then difficulties may be incurred in laminating the circuit board 10 to another board to form a multi-layer structure. Making the traces 20 and pads 22 too thick is also wasteful and increases manufacturing costs. A typical acceptable thickness of the traces 20 and the pads 22 is 1-2 mils.

To insure that the proper thickness of the traces 20 and pads 22 is being maintained, a thickness measurement should be made on at least sample lots of the board 10. A well-known technique for measuring the thickness of a light-reflective layer, such as the trace 20, on the surface 16 is the triangulation technique which may be best understood by reference to FIG. 2. To measure the thickness of one of the traces 20 on the circuit board 10, the board is first seated on a work surface 23. A generally collimated beam of light 24, typically generated by a laser (not shown), is directed at the surface 16 at an angle $\theta$ to illuminate an area 26 lying within the trace 20. A light-sensing device 28, such as a photodetector, is positioned directly above the circuit board 10 so as to trained on the area 26 to sense the intensity of the light reflected from the area.

Figure 2:
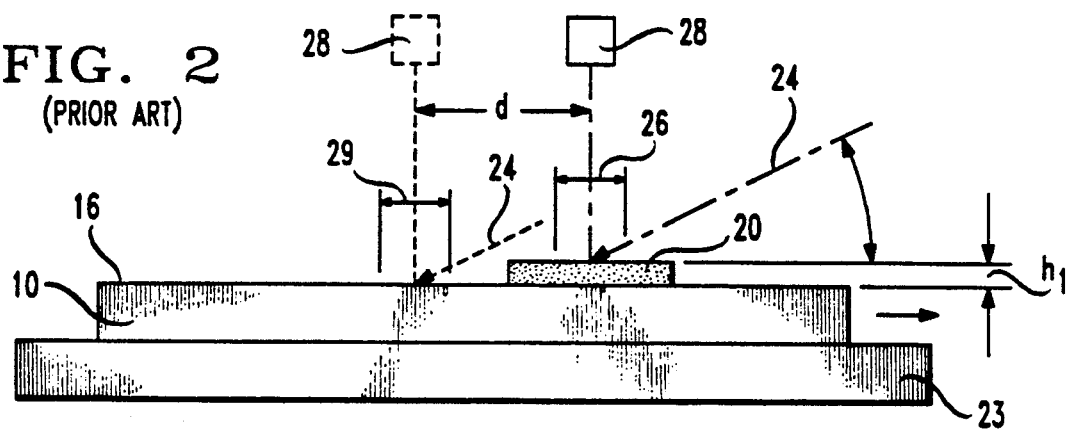
FIG. 2 is a side view of the circuit board of FIG. 1 showing a light beam directed at its surface in an attempt to measure the height of a metallized trace by the technique of triangulation.

To detect the height ($h_1$) of the trace 20, the intensity of the light reflected from the area 26 is measured by the photodetector 28 while the beam is directed thereat as seen in FIG. 2. The circuit board 10 is then shifted leftward (or alternatively, the beam 24 and the photodetector 28 are shifted rightward) so that the beam now strikes an area 29 on the surface 16 of the board 10 adjacent to the trace 20. The height $h_1$ of the trace 20 can be established from the relationship:

$$h_1 = d \cdot \tan(\theta) \quad (1)$$

where d is the lateral distance the beam 24 has been shifted.

While the triangulation technique should theoretically yield the height (thickness) $h_1$ of the trace 20, in practice, an accurate measurement of the trace height is generally not possible because the circuit board 10 is typically light translucent. The light-translucent nature of the circuit board 10 makes it virtually impossible to detect exactly where the area 29 illuminated by the beam is situated on the surface of the board 10. Thus, the light-translucent nature of the circuit board 10 makes it extremely difficult to obtain an accurate value of d, and hence $h_1$. Because of the inability to obtain accurate measurements of the trace 20 height (thickness) using the triangulation technique, presently, the trace height is measured by removing the trace 20 and measuring its thickness directly. While the thickness of the trace 20 can be measured very accurately in this manner, the circuit board 10 is rendered effectively useless for its intended purpose.

Figure 3:
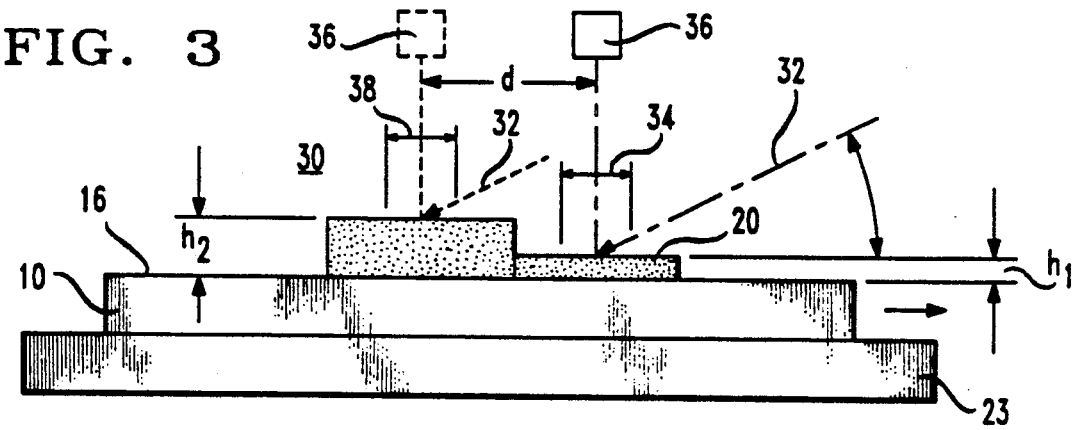
FIG. 3 is a side view of the circuit board of FIG. 1 showing how the trace thickness is measured in accordance with the present invention by placing a light-reflective member of known height adjacent to the metallized trace.

In accordance with the invention, the height ($h_1$) of the traces 20 and the pads 22 can be accurately measured optically using the triangulation technique as depicted in FIG. 3 with the aid of a light-reflective member 30 of a known height $h_2$. Referring to FIG. 3, to measure the thickness of the traces 20 in accordance with the invention, the light-reflective member 30 is placed on the surface 16 of the circuit board 10 immediately adjacent to the trace whose thickness is to be measured. The shape of the member 30 is not critical to the invention, and hence the member may take the form of a disc, a block, a pin or even a sphere. What is of importance is that the height $h_2$ of the member 30 be precisely known. To that end, it is desirable to measure the height of the member 30 immediately prior to placement on the circuit board 10 so that the measurement is calibrated.

With the member 30 placed as described, a light beam 32, generated in the same manner as the light beam 24 of FIG. 2, is directed at an angle $\theta$ at the trace 20 to illuminate an area 34 thereon. A photodetector 36, identical to the photodetector 28 of FIG. 2, is positioned directly above the area 34 so as to be trained thereon to detect the intensity of the light reflected from the area. Unlike the situation depicted in FIG. 2, the trace 20 of FIG. 3 is typically light reflective, thus causing the area 34 within the trace to appear bright to the photodetector 36 when illuminated by the beam 32.

Thereafter, the circuit board 10 is shifted leftward (or alternatively, the beam 32 and the detector 36 are displaced rightward) a distance such that the beam 32 now strikes an area 38 on the top surface of the light-reflective member 30. Since the light-reflective member 30 will reflect the beam 32 into the detector 36, the distance d by which the board 10 is shifted can thus be measured from the lateral distance between where the beam is seen by the detector 36 on the trace 20 and on the member 30. The lateral distance d is related to the height differential ($h_2 - h_1$) by the following relationship $$(h_2 - h_1) = d \cdot \tan(\theta) \quad (2)$$

From the known height $h_2$ of the member 30, the height $h_1$ of the trace 20 can be obtained simply by subtracting the measured thickness differential from it. In other words $$h_1 = h_2 - (h_2 - h_1) \quad (3)$$

When practicing the thickness measurement of the present invention, tight contact between the light-reflective member 30 and the surface 16 of the circuit board is very desirable. To this end, it is useful to fabricate the member 30 from ferromagnetic material (e.g., steel) and to make the work surface 23 magnetic so that the member will be attracted to the surface.

Figure 4:
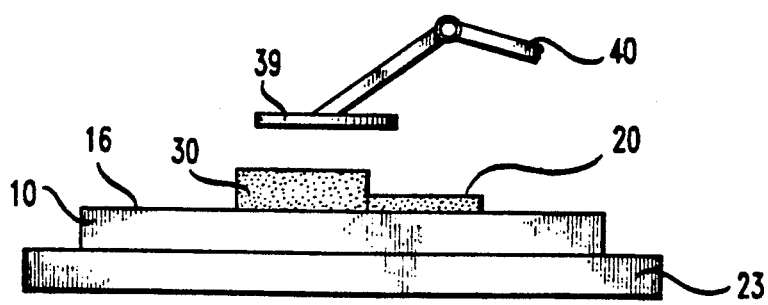
FIG. 4 shows an apparatus for placing the member of FIG. 3 on the circuit board and for removing it therefrom.

While the member 30 may be placed manually on the circuit board 10, automated placement (and retrieval) of the member may in fact be desirable, especially when in-line measurement of the thickness of one or more of the traces 20 is sought. Referring to FIG. 4, to achieve automatic placement and retrieval of the member 30, an electromagnet 39 may be attached to the end of a robot 40, or another type of mechanical positioning device. Thus, the electromagnet 39 can be placed over the member 30 to pick it up when the magnet is energized, and to place the member when the magnet is de-energized. When simultaneously measuring the thickness of several of the traces 20 using a plurality of members 30, the electromagnet 39 would take the form of an array of individual electromagnets (not shown), each overlying the corresponding member 30 to be placed and picked up.

The foregoing discloses a technique for measuring the thickness of a light-reflective layer 20 on a light-translucent substrate by placing a light-reflective member 30 of known height next to the layer. The thickness differential between the member 30 and the layer 20 is then measured using a known technique, such as triangulation, allowing the layer thickness to be obtained by subtracting the thickness differential from the known height of the member.

It is to be understood that the above-described embodiments are merely illustrative of the principles of the invention. Various modifications and changes may be made thereto by those skilled in the art which will embody the principles of the invention and fall within the spirit and scope thereof.

I claim:

1. A method for measuring the height of a raised, light-reflective layer on a light-translucent substrate comprising the steps of:
    placing a light-reflective member of a known height on the substrate adjacent to the light-reflective layer;
    optically measuring the difference in height between the light-reflective layer and the light-reflective member; and
    establishing the height of the light-reflective layer in accordance with the difference between the known height of the light-reflective member, and the measured height differential between the member and the layer.

2. The method according to claim 1 wherein the height differential between the light-reflective member and the light-reflective layer is optically measured by the steps of:
    directing a beam of light at an angle $\theta$ towards the surface of the circuit board to illuminate at least a portion of the surface area on the light-reflective layer,
    positioning a light-sensing mechanism directly above the illuminated area on the light-reflective layer area so that the light-sensing mechanism is trained thereon;
    displacing the substrate relative to the beam so that the beam strikes the light-reflective layer;
    measuring the distance d moved by the substrate;
    calculating the height differential between the light-reflective member and the light-reflective layer in accordance with the relationship height differential $= d \cdot \tan(\theta)$.

3. The method according to claim 1 wherein the member is magnetically placed on and retrieved from, the surface of the substrate.

4. A method for measuring the height of a metallized area on a light-translucent circuit board comprising the steps of:
    placing a light-reflective member of a known height on the circuit board adjacent to the metallized area;
    optically measuring the difference in height between the metallized area and the light-reflective member; and
    establishing the height of the metallized area in accordance with the difference between the known height of the member and the measured height differential between the member and the metallized area.

5. The method according to claim 4 wherein the height differential between the light-reflective member and the metallized area is optically measured by the steps of:
    directing a beam of light at an angle $\theta$ towards the surface of the circuit board to illuminate at least a portion of the surface area of the light-reflective layer;
    positioning a light-sensing mechanism directly above the illuminated area on the light-reflective layer so that the light-sensing mechanism is trained thereon;
    displacing the substrate relative to the beam so that the beam strikes the metallized area;
    measuring the distance d moved by the circuit board;
    calculating the height differential between the light-reflective member and the light-reflective metallized area in accordance with the relationship height differential $= d \cdot \tan(\theta)$.

6. The method according to claim 4 wherein:
    the member is magnetically placed on, and retrieved from the surface of the circuit board.

* * * * *